United States Patent
Herdin et al.

(10) Patent No.: US 7,149,619 B2
(45) Date of Patent: Dec. 12, 2006

(54) METHOD OF REGULATING AN INTERNAL COMBUSTION ENGINE

(75) Inventors: Günther Herdin, Jenbach (AT); Matthias Schulze, Innsbruck (AT); Dieter Chvatal, Jenbach (AT)

(73) Assignee: GE Jenbacher GmbH & Co. OHG (AT)

( * ) Notice: Subject to any disclaimer, the term of this patent is extended or adjusted under 35 U.S.C. 154(b) by 0 days.

(21) Appl. No.: 11/056,489

(22) Filed: Feb. 9, 2005

(65) Prior Publication Data

US 2005/0172942 A1    Aug. 11, 2005

(30) Foreign Application Priority Data

Feb. 9, 2004    (AT) ................ A 185/2004

(51) Int. Cl.
*B60T 7/12* (2006.01)
*G06F 17/00* (2006.01)

(52) U.S. Cl. ............... 701/103; 701/104; 123/672

(58) Field of Classification Search ........ 123/672–703; 701/101, 103, 104, 109
See application file for complete search history.

(56) References Cited

U.S. PATENT DOCUMENTS

| | | | | |
|---|---|---|---|---|
| 5,697,346 A | 12/1997 | Beck | ............ | 123/494 |
| 6,363,714 B1* | 4/2002 | Hoard et al. | ........... | 60/275 |
| 6,397,582 B1* | 6/2002 | Hanaoka et al. | ........... | 60/274 |
| 6,523,531 B1 | 2/2003 | Feldkamp et al. | ........... | 123/698 |
| 6,920,388 B1* | 7/2005 | Yasui | ........... | 701/109 |
| 2002/0029561 A1* | 3/2002 | Ueno et al. | ........... | 60/277 |
| 2003/0093989 A1* | 5/2003 | Ueno et al. | ........... | 60/277 |
| 2004/0163380 A1* | 8/2004 | Yasui | ........... | 60/285 |
| 2005/0172942 A1* | 8/2005 | Herdin et al. | ........... | 123/672 |
| 2005/0177300 A1* | 8/2005 | Herdin et al. | ........... | 701/103 |
| 2005/0228572 A1* | 10/2005 | Mansbart | ........... | 701/108 |

FOREIGN PATENT DOCUMENTS

| | | |
|---|---|---|
| AT | 1 158 149 A1 | 5/2000 |
| AT | 1 225 330 A2 | 1/2002 |
| AT | 1 286 035 A2 | 7/2002 |
| DE | 31 29 726 A1 | 2/1982 |
| DE | 38 33 123 A1 | 4/1989 |
| DE | 39 18 683 A1 | 9/1990 |
| EP | 0 306 983 A2 | 3/1989 |
| EP | 0 259 382 B1 | 10/1989 |
| EP | 1 225 330 A2 | 7/2002 |

* cited by examiner

*Primary Examiner*—John T. Kwon
(74) *Attorney, Agent, or Firm*—Lorusso & Associates

(57) ABSTRACT

A method of regulating an internal combustion engine, in particular involving a lean-burn mode of operation, for achieving predeterminable nitrogen oxide emission values from the internal combustion engine, wherein the λ-value of a fuel-air mixture to be burnt in the internal combustion engine or an equivalent engine parameter in a defined relationship with said λ-value is regulated in dependence on the amount of fuel supplied per unit of time or in dependence on the fuel energy supplied per unit of time ($Q_{zu}$).

27 Claims, 3 Drawing Sheets

METHOD OF REGULATING AN INTERNAL COMBUSTION ENGINE

CROSS-REFERENCE TO RELATED APPLICATIONS

Figure 1:
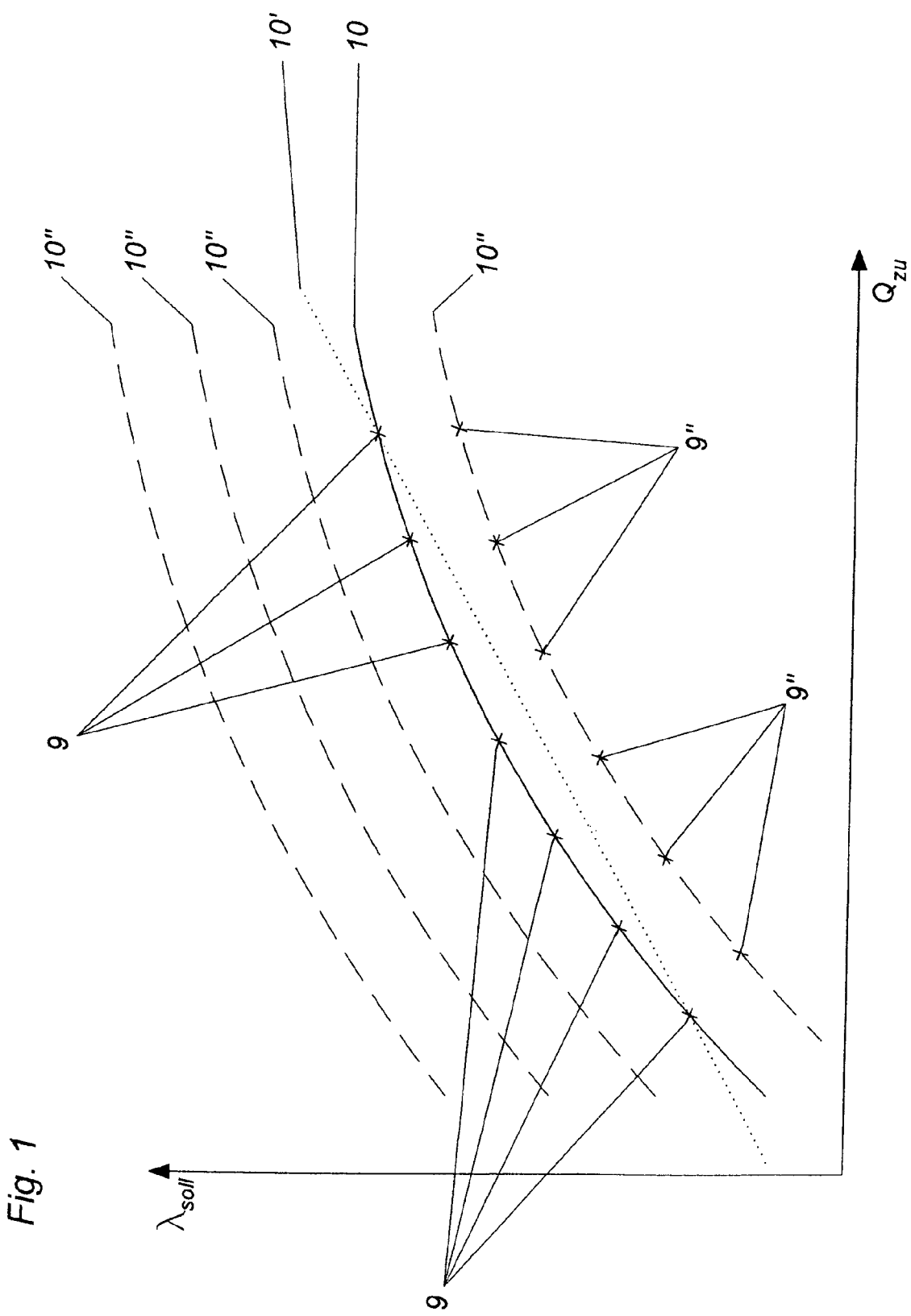

This application claims priority to Austrian Application No. A 185/2004, filed Feb. 9, 2004, the contents of which are incorporated by reference in their entirety.

The present invention concerns a method of regulating an internal combustion engine, in particular with a lean-burn mode of operation, to achieve predeterminable nitrogen oxide emission values for the internal combustion engine, and a corresponding regulating apparatus and internal combustion engine.

It is already known from EP 0 259 382 B1 for an internal combustion engine for driving an electrical generator to be operated with constant nitrogen oxide emission values, by regulating the mixture pressure upstream of the inlet valves of the cylinders in dependence on the electrical power delivered by the generator. In that situation the reference value in respect of the mixture pressure upstream of the inlet valves is taken from a family of curves which shows the dependency of the mixture pressure on the delivered electrical power, at constant emission values. Then, the measured actual value of the pressure upstream of the inlet valves is regulated to its reference value determined by way of the family of curves, by way of adjustment of the fuel-air ratio in a gas mixer. The curve used for that purpose is produced by measuring at least two operating points involving identical $NO_x$ emission values. By means of that previously known method, it is possible for an internal combustion engine to very accurately maintain the desired emission values in a wide power range. The system known from the stated European patent enjoys the advantage that it involves practically no wear and ageing of sensitive sensors.

European patent application EP 1 225 330 A2 sets forth a further improved system of the general kind set forth, in which the regulating layout known from EP 0 259 382 B1 has been further supplemented by ignition timing adjustment in order to provide a regulating reserve margin for rapid reaction to changes in load, in any operating condition. In addition that regulating system serves to always operate the internal combustion engine at optimum efficiency.

A disadvantage of those known regulating systems is that a signal which is characteristic of the power delivered by the internal combustion engine must always be available. The electrical power delivered can be used for that purpose, in the case of internal combustion engines which drive a generator for producing electrical current. However, for other engines, for example for driving pumps, a corresponding power signal is generally not available and therefore would have to be measured as an additional operation by means of expensive additional sensors in order to use the above-indicated regulating layouts.

SUMMARY

Therefore the object of the present invention is to provide a regulating method of the general kind set forth, in which it is possible to forego a measured power signal.

In accordance with the invention that is achieved in that the λ-value of a fuel-air mixture to be burnt in the internal combustion engine or an equivalent engine parameter in a defined relationship with said λ-value is regulated in dependence on the amount of fuel supplied per unit of time or in dependence on the fuel energy supplied per unit of time.

In accordance with the invention therefore it is provided that, instead of the power delivered by the internal combustion engine, the amount of fuel supplied per unit of time or the fuel energy supplied per unit of time is to be used as the base parameter for regulation. In that respect, the λ-value or an equivalent engine parameter related thereto is regulated. As is generally known the λ-value describes the air ratio in combustion processes, wherein λ=1 corresponds to a stoichiometric combustion. The equivalent engine parameter used can be for example the pressure upstream of the inlet valves of the internal combustion engine or the calorific value of the fuel-air mixture to be burnt or however also a nitrogen oxide emission value from the exhaust gases. The amount of fuel supplied per unit of time is desirably determined by means of a through-flow measurement procedure. If regulation is based on the fuel energy supplied per unit of time, the through-flow measurement procedure is executed in combination with a calorific value measurement procedure in respect of the fuel. Multiplication of the two measurement values gives the fuel energy supplied per unit of time.

Besides the stated method the invention also concerns a regulating apparatus for carrying out the method and an internal combustion engine including such a regulating apparatus.

Figure 2:
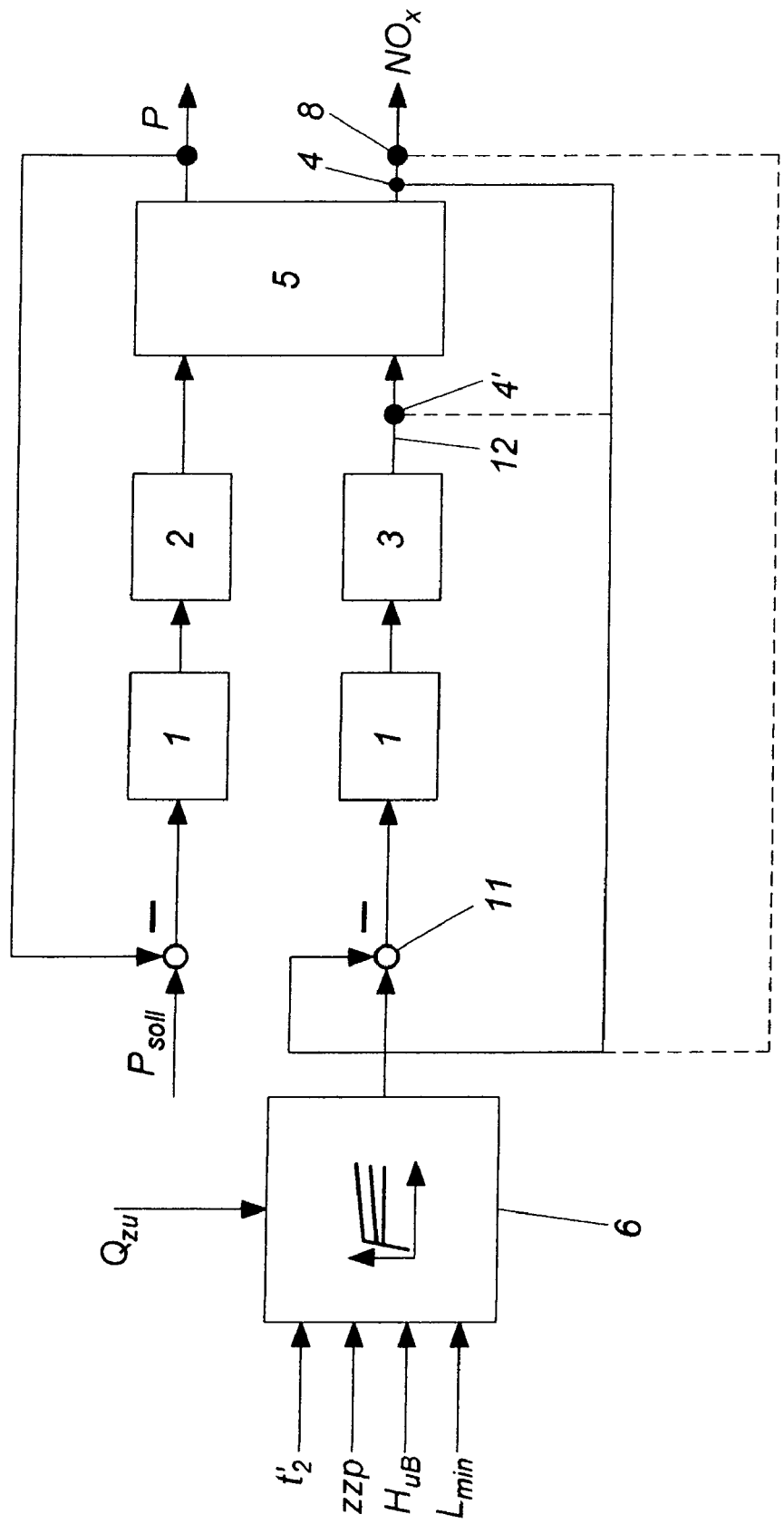
Figure 3:
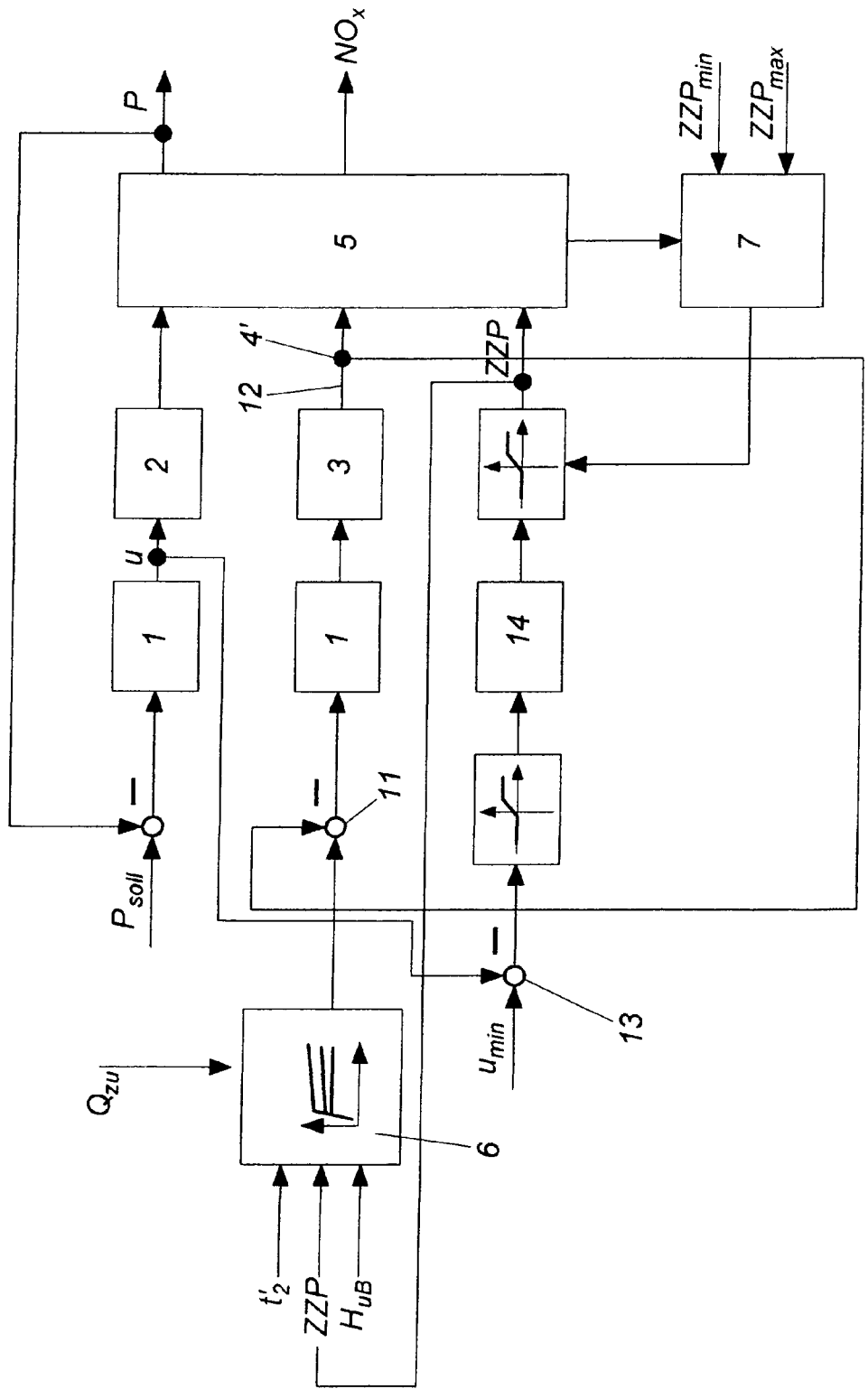

Further details and features of the present invention are apparent from the specific description hereinafter. In the drawing:

FIG. 1 is a diagrammatically illustrated family of curves for use in the method according to the invention, FIG. 2 is a diagrammatic view of a first embodiment of a regulating method according to the invention, and FIG. 3 is a second embodiment according to the invention which additionally also includes ignition timing adjustment.

DETAILED DESCRIPTION

FIG. 1 diagrammatically shows the dependency of the λ-reference value on the fuel energy supplied per unit of time, as indicated at $Q_{zu}$. All those operating points of the internal combustion engine, which each involve a given nitrogen oxide emission value, lie on the curve 10 shown as a solid line. The curve or the family of curves is produced by calibration measurement procedures, for example when the internal combustion engine is set in operation. That is effected by a procedure whereby a λ-reference value is so set at an operating point 9 at a given $Q_{zu}$-value, thus giving the desired nitrogen oxide emission value from the internal combustion engine. In order to produce a curve 10, suitably setting another value in respect of the fuel energy supplied per unit of time then provides at least one second operating point 9, in which case in turn the λ-reference value is determined for example by adjustment of the fuel-air ratio at which the desired nitrogen oxide emission value is attained. The two operating points 9 which are determined in that way afford in a first approximation a linear curve 10' (shown in broken line). When more than two operating points 9 are measured with the above-indicated operating procedure, at a constant nitrogen oxide emission value, a curved curve, like the curve 10, can also be afforded therefrom.

In the case of internal combustion engines in which certain operating parameters such as for example the temperature $t_2'$ of the fuel-air mixture or the ignition point indicated at ZZP or the quality of the fuel supplied can change greatly, it may also be appropriate to also take account of the influence of those parameters. That then generally affords a family of curves. FIG. 1 shows by way of example in broken lines various curves 10" which are produced with suitable measurement of operating points 9" at respectively constant nitrogen oxide emission values and respectively different temperature values $t_2'$. When a plurality of influencing parameters are taken into consideration, that then overall affords a multi-dimensional family of curves. Alternatively, based on a single curve 10, it is however also possible to take account of corresponding correction values for the temperature of the fuel-air mixture $t_2'$ or the ignition point (at ZZP) or further influencing parameters. In order to keep the expenditure involved when measuring the family of curves using the above-depicted mode of operation within limits, it is also possible to apply estimates if the influence of a given parameter is known.

Even if FIG. 1 only shows one family of curves for the dependency between the reference value of $\lambda$ and the supplied fuel energy (indicated at $Q_{zu}$), similar curves or families of curves are nonetheless afforded in respect of the dependencies of the specified equivalent engine parameters (pressure upstream of the inlet valves, calorific value of the fuel-air mixture or nitrogen oxide emission value) on the supplied amount of fuel per unit of time or the supplied fuel energy per unit of time.

FIG. 2 shows a first regulating method according to the invention for an internal combustion engine. It firstly has, as is known per se, a power regulator in which a PID regulator 1 adjusts a power setting member 2 (for example a throttle butterfly valve or a by-pass blow-off valve of the internal combustion engine to be regulated), in such a fashion that the power P produced by the engine 5 corresponds to the desired power reference value indicated at $P_{soll}$. Now, in accordance with the invention, there is provided a regulating section for the engine 5, in which the dependency, established in the family of curves 6, of the $\lambda$-value or an equivalent engine parameter on the amount of fuel supplied per unit of time or the fuel energy supplied per unit of time (indicated at $Q_{zu}$) is used to achieve constant nitrogen oxide emission values ($NO_x$). That regulating line is firstly described with reference to an example based on the dependency of the $\lambda$-value on the fuel energy supplied per unit of time ($Q_{zu}$).

In operation of the internal combustion engine the through-flow amount and the calorific value of the fuel are measured by means of a through-flow measuring device and a calorific value probe in the fuel feed line of the internal combustion engine. Multiplication of those two values gives the fuel energy supplied per unit of time $Q_{zu}$ (in J/s). Then, by reference to that $Q_{zu}$ value, the corresponding $\lambda$-reference value is determined in the family of curves 6 described with reference to FIG. 1. In that respect, as required, it is possible to take account of the temperature $t_2'$ of the fuel-air mixture and/or the ignition point ZZP and/or the calorific value of the fuel $H_{UB}$ and/or the stoichiometric minimum air requirement $L_{min}$. The reference value determined in that way in respect of the $\lambda$-value is compared in the comparator 11 to an actual value in respect of $\lambda$, which is measured by means of the $\lambda$-probe 4 in the exhaust tract. Adaptation of the actual value to the reference value is effected by means of a PID regulator 1 which actuates a device 3 for adjusting the fuel-air mixture.

The regulating system described with reference to FIG. 2 on the basis of the parameters $Q_{zu}$ and the $\lambda$-value also operates in a similar manner for the equivalent engine parameters which have already been mentioned (as an equivalent substitute for the $\lambda$-value) and the amount of fuel supplied per unit of time (as an equivalent substitute for $Q_{zu}$). For that purpose it is only necessary to use a respectively appropriate family of curves 6 and a corresponding measuring probe. If the calorific value of the fuel-air mixture is selected as the equivalent engine parameter, then a preferably online-measuring calorific value probe 4' (shown in broken line as an alternative) is to be arranged in order to determine the actual value of the fuel-air mixture in the fuel-air mixture feed conduit 12. If the pressure upstream of the inlet valves is selected as the equivalent engine parameter, a corresponding pressure measuring device is thus to be adopted. That is also desirably arranged in the fuel-air mixture feed conduit 12. As an alternative thereto however, if the regulating system is to be based on the nitrogen oxide emission value from the internal combustion engine, it is also possible to use a device 8 at the exhaust gas side, for measuring the nitrogen oxide emission values. That variant is shown in broken line in FIG. 2. The operation of determining the parameters $t_2'$, ZZP, $H_{UB}$ and/or $L_{min}$ which are optionally to be taken into consideration in the family of curves is effected in accordance with the state of the art, a suitable temperature probe for measuring $t_2'$ desirably also being arranged in the fuel-air mixture feed conduit 12. Replacement of the parameter $Q_{zu}$ by the amount of fuel supplied per unit of time, which is only determined by means of a through-flow measurement procedure (unit $m^3/s$; possibly converted to normal conditions) is generally recommended only if the fuel is of uniform quality. The quality of the fuel can be characterised for example by a calorific value measurement operation conducted on the fuel.

The first regulating system according to the invention, as shown in FIG. 2, is also supplemented by a regulating section for ignition timing adjustment in FIG. 3. That regulating section can ensure that there is always a regulating reserve margin available for rapid reaction to changes in load at the internal combustion engine 5. For that purpose, a signal U which is characteristic in respect of the regulating reserve margin of the power setting member 2 is taken off between the power setting member 2 and the associated PID regulator 1. Upon comparison at the point 13, a check is made to ascertain whether the regulating reserve margin is greater than a predetermined minimum $U_{min}$. If that is not the case, adjustment of the ignition point is effected within predetermined limits $ZZP_{min}$ and $ZZP_{max}$ by means of the ignition timing control device 14. In addition that arrangement may also include a knock regulator 7 which, by limiting the range of adjustment, prevents the engine 5 from suffering from knock by virtue of displacement of the ignition point. The regulating section additionally shown in FIG. 3 both ensures the desired regulating reserve margin and also always achieves optimum efficiency for the internal combustion engine. In addition adaptation to the ambient conditions (for example pressure and temperature) is also possible by adjustment of the ignition point. Ignition point adjustment itself corresponds to the operating procedure disclosed in European patent application EP 1 225 330 A2 so that attention is directed thereto.

The method according to the invention is favorable in particular for the operation of spark-ignition and/or mixture-charged, preferably stationary, Otto-cycle engines which are preferably operated with a combustible gas, for example methane, as the fuel.

The invention claimed is:

1. A method of regulating an internal combustion engine for achieving predeterminable nitrogen oxide emission values from the internal combustion engine, wherein the $\lambda$-value of a fuel-air mixture to be burnt in the internal combustion engine or an equivalent engine parameter in a defined relationship with said $\lambda$-value is regulated in dependence on the amount of fuel supplied per unit of time or in dependence on the fuel energy supplied per unit of time.

2. The method as set forth in claim 1 wherein the fuel is a combustible gas.

3. The method as set forth in claim 1 wherein the amount of fuel supplied per unit of time is determined by means of a through-flow measurement operation.

4. The method as set forth in claim 1 wherein the fuel energy supplied per unit of time is determined by means of a through-flow measurement operation in combination with a calorific value measurement operation in respect of the fuel.

5. The method as set forth in claim 1 wherein the equivalent engine parameter related to the λ-value is a pressure upstream of the inlet valves of the internal combustion engine.

6. The method as set forth in claim 1 wherein the equivalent engine parameter related to the λ-value is a calorific value of the fuel-air mixture.

7. The method as set forth in claim 1 wherein the equivalent engine parameter related to the λ-value is a nitrogen oxide emission value.

8. The method as set forth in claim 1 wherein a dependency of reference values in respect of the λ-value or the equivalent engine parameter on the amount of fuel supplied per unit of time or the fuel energy supplied per unit of time is established in a family of curves and is read out of same in operation of the internal combustion engine.

9. The method as set forth in claim 1 wherein the influence of the ignition point or the temperature of the fuel-air mixture or the quality of the fuel or the stoichiometric minimum air requirement is taken into account or corrected in determining the dependency of the reference value of the λ-value or the reference value of the equivalent engine parameter on the amount of fuel supplied per unit of time or the fuel energy supplied per unit of time.

10. The method as set forth in claim 9 wherein the quality of the fuel is determined by way of a calorific value measurement operation on the fuel.

11. The method as set forth in claim 1 wherein an actual value in respect of the λ-value or the equivalent engine parameter is detected and regulated to a reference value, wherein the reference value is determined in dependence on the amount of fuel supplied per unit of time or in dependence on the fuel energy supplied per unit of time.

12. The method as set forth in claim 11 wherein the actual value is adapted to the reference value by adjustment of the mixture ratio of the fuel-air mixture.

13. The method as set forth in claim 1 wherein ignition timing adjustment is provided for affording a regulating reserve margin in regard to power regulation.

14. The method as set forth in claim 1 wherein it is suitable for the regulation of an internal combustion engine involving a lean-burn mode of operation.

15. The method as set forth in claim 2 wherein the fuel has methane.

16. The method as set forth in claim 11 wherein the actual value of the λ-value or the equivalent engine parameter is measured directly.

17. A regulating apparatus for regulating an internal combustion engine comprising means for performing the method as set forth in claim 1.

18. An internal combustion engine comprising a regulating apparatus comprising a means for performing the method set forth in claim 1.

19. The internal combustion engine as set forth in claim 18 further comprising a device for adjusting the fuel-air ratio.

20. The internal combustion engine as set forth in claim 18 further comprising a through-flow measuring device in a fuel feed conduit.

21. The internal combustion engine as set forth in claim 20 further comprising a calorific value probe arranged in the fuel feed conduit for determining the calorific value of the fuel.

22. The internal combustion engine as set forth in claim 18 further comprising a device arranged in a fuel-air mixture feed conduit for mixing the fuel-air mixture to at least one cylinder of the internal combustion engine wherein the device comprises a calorific value probe for determining the calorific value of the fuel-air mixture or a temperature probe for determining the temperature of the fuel-air mixture.

23. The internal combustion engine as set forth in claim 18 wherein the engine has a device for measuring the nitrogen emission level.

24. The internal combustion engine as set forth in claim 18 further comprising a λ-probe in an exhaust gas tract.

25. The internal combustion engine as set forth in claim 18 wherein the engine comprises a spark-ignition Otto-cycle engine.

26. The internal combustion engine as set forth in claim 18 wherein the engine comprises a mixture-charged Otto-cycle engine.

27. The internal combustion engine as set forth in claim 18 wherein the engine comprises a stationary Otto-cycle engine.

* * * * *